Patented Aug. 31, 1926.

1,598,546

UNITED STATES PATENT OFFICE.

LEO H. BAEKELAND, OF YONKERS, AND AUGUST H. GOTTHELF, OF HASTINGS-UPON-HUDSON, NEW YORK, ASSIGNORS, BY MESNE ASSIGNMENTS, TO BAKELITE CORPORATION, OF NEW YORK, N. Y., A CORPORATION OF DELAWARE.

RESINOUS BODIES DERIVED FROM ACETALDEHYDE AND PROCESS OF MAKING THE SAME.

No Drawing. Application filed December 19, 1919. Serial No. 346,104.

This invention relates to resins or resin-like bodies derived from aldehydes of higher molecular weight than formaldehyde, by interaction with phenols or phenolic bodies, preferably with the intervention of suitable condensing agents, such for example as hydrochloric acid. The invention relates also to certain condensation products resulting from the further reaction upon products derived from acetaldehyde or its equivalents (paraldehyde, etc.) of formaldehyde or equivalent bodies possessing an active or mobile methylene group (paraform, methylene-acetate, hexamethylenetetramine, etc. etc.).

It is known that phenols are capable of reacting with acetaldehyde to yield resinous condensation products. See for example Berichte 5, 1095; 19, 3004 and 3009; 25, 3477; 27, 2411; U. S. Patent 643,012 to Smith; etc. The properties of the prior products as described in the above citations are, however, quite distinct from those of bodies prepared in the manner hereinafter disclosed.

The invention will be described by reference to certain illustrative examples thereof, it being understood that our invention is not limited to the particular proportions or manipulations detailed in these examples, or to the particular phenolic bodies or aldehydes specifically mentioned therein; for as stated above the process is of general applicability to aldehydes of higher molecular weight than formaldehyde.

Example I.

1000 grams of phenol are mixed with 550 grams of paraldehyde $(C_2H_4O)_3$, and about 50 cc. of strong hydrochloric acid solution is added to the mixture. In order to moderate the reaction it is desirable to add also about 200 cc., more or less, of water. The mixture is boiled, preferably under a return condenser, until a separation into two layers occurs; and the boiling is continued to thicken somewhat the resinous layer. This ordinarily requires about five hours. The water is then eliminated in any convenient way, as for example by evaporation at ordinary or lower pressures. There results an anhydrous resinous mass, which is initially fusible, and soluble in alcohol, acetone and some other neutral solvents. Upon further heating at sufficient temperatures, say 100°–200° C., this mass is found to set or solidify under the action of heat. It is preferable, although not essential, that this heating should be effected under sufficiently high pressure to insure the production of homogeneous masses or shapes, especially since the use of pressure in this connection permits the use of relatively high temperatures, and thereby shortens the heating operation.

The product resulting from this heating operation is found to be insoluble or difficultly soluble in the usual neutral solvents, although swelling with partial solution in acetone. It is infusible at all temperatures up to 218° C. (vapors of boiling naphthalene) and somewhat higher, but it possesses the characteristic property, differentiating it from any phenolic resin known to us, of melting at still higher temperatures, this melting being accompanied by some evolution of gas and incipient decomposition.

The condensation product prepared as above described can be manipulated and utilized in accordance with the various methods which are now well understood and widely used in connection with the phenolic condensation product art. For example, it may be employed in the manufacture of molded articles, for which purpose it will preferably be compounded with fibrous or other fillers before the final hardening operation, and then hardened, either by application of heat, or preferably by the conjoint action of heat and pressure, the pressure being applied for example in a hot hydraulic press or equivalent device coincidently with the shaping operation. Or the condensation product may be dissolved while yet in the soluble stage in appropriate neutral solvents or mixtures thereof, and the resulting solutions may be used as varnishes or lacquers, or for the impregnation of paper, cloth, wood or other porous substances, the varnish films or impregnated articles being preferably subsequently subjected to a curing operation in which they are submitted to the action of heat or of heat and pressure to effect such further hardening as may be required for any specific purpose. Also appropriate plasticizing agents, such as resinous bodies or the like, may be incorporated with the material in advance of the hardening step; or the properties of the material may be otherwise modified, as for instance by admixture with the known condensation products of the phenol-formaldehyde type, these latter being either of the permanently fusible or of the potentially reactive class.

The proportion of paraldehyde specified above may be varied within considerable limits, while attaining similar technical effects. If, however, the proportion be greatly reduced, quite a different technical effect is obtained as described in example II.

Instead of carrying out the first step of the above described reaction under a return condenser, the reacting bodies may be heated in an autoclave or other type of closed container; or if desired the complete reaction leading to the formation of the ultimate high-melting product may be carried out in such closed vessel.

Example II.

1000 grams of phenol are mixed with 400 grams of paraldehyde, and with about 50 cc. of commercial strong hydrochloric acid, preferably with the further addition of about 200 cc. of water serving to moderate the reaction. The mixture is boiled under a return condenser or heated in a closed vessel as described above. The separation into two layers occurs rapidly, and the boiling is continued for about 5 hours, more or less, to thicken the resinous product. The product is then heated in order to evaporate water, and is ultimately brought to a temperature of about 200° C., which temperature is maintained until an anhydrous resin results.

The resin prepared with the reduced proportion of paraldehyde as described above may be somewhat further hardened if desired by blowing steam through it in the molten state, or by heating in a current of inert gas or in vacuo. It is found to be fusible, and to belong to the non-reactive type; that is to say it does not set or solidify when maintained for long periods at elevated temperatures, say 150° C. It is soluble in acetone, alcohol and caustic soda solutions, but is practically insoluble in benzol.

The resin having the above characteristics, hereinafter referred to for convenience as the permanently fusible resin, may be transformed into an infusible and practically insoluble body by reacting thereon with formaldehyde, or equivalent bodies having a mobile methylene group (paraform, hexamethylenetetramine, etc.) For instance 100 parts by weight of the permanently fusible resin may be intimately mixed with about 10 to 12 parts of paraform, or equivalent proportions of hexamethylenetetramine, and the resulting product or mixture will be found to be potentially reactive, being capable of transformation by sufficient heating into a hard, infusible product. This heating for the purpose of bringing about the final transformation is best accomplished by the conjoint use of heat and pressure, so as to insure complete homogeneity in the product and to avoid all porosity. The heat may be applied as a part of the molding operation in a hydraulic or other press as described above. Before such final transformation into the infusible body, the resin, or the mixture of the resin with paraform, hexamethylenetetramine, or similar bodies, may of course be commingled with fibrous or other suitable fillers, appropriate plasticizing or coloring agents, or other substances, as will be readily understood by those skilled in this art.

The fusible resinous body derived from paracetaldehyde, after being mixed with methylene-containing body or even after having undergone therewith some partial reaction, is yet fusible and soluble, but is potentially reactive in the sense that it is capable of transformation by further heating at a sufficient temperature into the infusible product. The potentially reactive resin may be dissolved in alcohol or other suitable solvents and solvent mixtures, and the resulting solutions applied for various purposes in the arts, as mentioned above, and as now well understood in the phenol-formaldehyde condensation product art.

Instead of paraldehyde, acetaldehyde or an aqueous solution thereof may be used, or other aldehydes of higher molecular weight than formaldehyde.

In regard to the proportions of reagents referred to in connection with the foregoing examples, it should be pointed out that the character of the product is dependent upon the proportions in which the reacting bodies combine, as distinguished from the proportions in which they are present in the original mixture. This results from the fact that unless the operation is properly conducted very considerable proportions of reagents may be lost, for example in such operations as washing, evaporating, heating or the like. For example heating in a closed vessel frequently insures with a smaller proportion of aldehyde, results which can only be obtained with larger proportions of aldehyde under a return condenser or especially in an open vessel. Unless these facts are taken into consideration, erratic results may be obtained, even when employing the same materials in the same proportions.

Our invention is not restricted to the use of specific condensing agents, or indeed of any condensing agent since experience has proven that in most cases there is a considerable range of substitution of condensing agents, involving generally a special manipulation in the course of the process. It may be possible, especially by conducting the reaction under pressure to avoid the use of acid or other condensing agents in the initial reaction. The transformation of the permanently fusible resin into an insoluble product through the agency of paraform is facilitated by the action of basic condensing agents, including ammonia, caustic alkalies, basic salts or the like.

Instead of phenol, other phenolic bodies, including cresol and cresol mixtures may be substituted wholly or in part, such substitution involving of course certain variations in the manipulation as well as in the characteristics of the product.

We claim:—

1. The herein described infusible condensation product resulting from the reaction of a body containing an active methylene group upon a condensation product of a phenol and acetaldehyde.

2. The herein described potentially reactive composition, comprising a fusible condensation product of a phenol and acetaldehyde, and a hardening agent having an active methylene group, said composition capable of transformation by heat into an infusible product.

3. The herein described condensation product a phenolic body and acetaldehyde, characterized by its capability of remaining indefinitely in a state of fusion at a temperature about 150° C.

4. In a process of making phenolic condensation products, the steps comprising preparing a fusible reaction product of a phenolic body and acetaldehyde, and hardening said product by reacting thereon with a body containing an active methylene group.

5. In a process of making a potentially reaction phenolic condensation product, the steps comprising preparing a fusible reaction product of a phenolic body and acetaldehyde, and commingling therewith a hardening agent containing an active methylene group.

6. The process of producing a phenolic condensation product, comprising, heating together a phenol and acetaldehyde in the presence of a small percentage of an acid condensing agent until a permanently-fusible, soluble, phenol resin has been formed.

7. The process of producing a phenolic condensation product, comprising, heating together a phenol and acetaldehyde in the presence of a small percentage of hydrochloric acid until a fusible, soluble resin has been formed, and removing water and hydrochloric acid from the mass.

8. The process of producing a phenolic condensation product, comprising, heating together a phenol and acetaldehyde in the presence of a small percentage of an acid condensing agent until a fusible, soluble resin has been formed, boiling off water from the mass, and blowing steam through the mass to remove the excess phenol.

9. The process of producing a phenolic condensation product, comprising, heating together a phenol and acetaldehyde in the presence of a small percentage of an acid condensing agent until permanently-fusible, soluble resin has been formed, removing water and acid from the mass, and mixing with the resin thus formed a methylene-containing body adapted and in proper proportion to react therewith, on application of heat, to form an infusible body.

In testimony whereof, we affix our signatures.

LEO H. BAEKELAND.
AUGUST H. GOTTHELF.